US006851695B2

United States Patent
Lindenman et al.

(10) Patent No.: US 6,851,695 B2
(45) Date of Patent: Feb. 8, 2005

(54) BASE RAIL KIT FOR MOTOR VEHICLE

(75) Inventors: Thomas W. Lindenman, South Bend, IN (US); Richard W. McCoy, Granger, IN (US); Anthony S. Roberts, Granger, IN (US); Kelly W. Walterhouse, Elkhart, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 0 days.

(21) Appl. No.: 10/436,509

(22) Filed: May 13, 2003

(65) Prior Publication Data

US 2003/0209879 A1 Nov. 13, 2003

Related U.S. Application Data

(60) Provisional application No. 60/379,946, filed on May 13, 2002.

(51) Int. Cl.[7] .............................................. B62D 53/08
(52) U.S. Cl. ................... 280/441; 280/441.1; 280/901; 248/231.9; 410/121
(58) Field of Search ................................. 280/441, 433, 280/438.1, 441.1, 901, 495; 248/231.9, 503; 410/121

(56) References Cited

U.S. PATENT DOCUMENTS

| 5,509,682 A | | 4/1996 | Lindenman et al. |
| 5,513,869 A | * | 5/1996 | Putnam .................... 280/415.1 |
| 5,529,329 A | | 6/1996 | McCoy |
| 6,158,761 A | * | 12/2000 | King .......................... 280/495 |

FOREIGN PATENT DOCUMENTS

| EP | 1333131 A1 * | 8/2003 | ........... E04D/13/16 |

OTHER PUBLICATIONS

Reese Products, Inc. 1997 Products, Applications & Towing Accessories Catalog, p. 44.

* cited by examiner

Primary Examiner—Kevin Hurley
(74) Attorney, Agent, or Firm—King & Schickli, PLLC

(57) ABSTRACT

The present invention relates to a base rail kit for a motor vehicle. The base rail kit includes a base rail including first and second mounting flanges, a first bracket including a first base rail support platform and a first mounting lug, a second bracket including a second base rail support platform and a second mounting lug, first and second spacers and first and second fasteners.

11 Claims, 3 Drawing Sheets

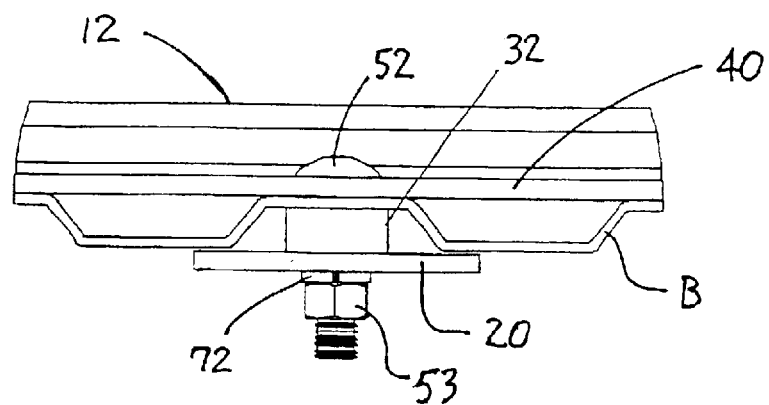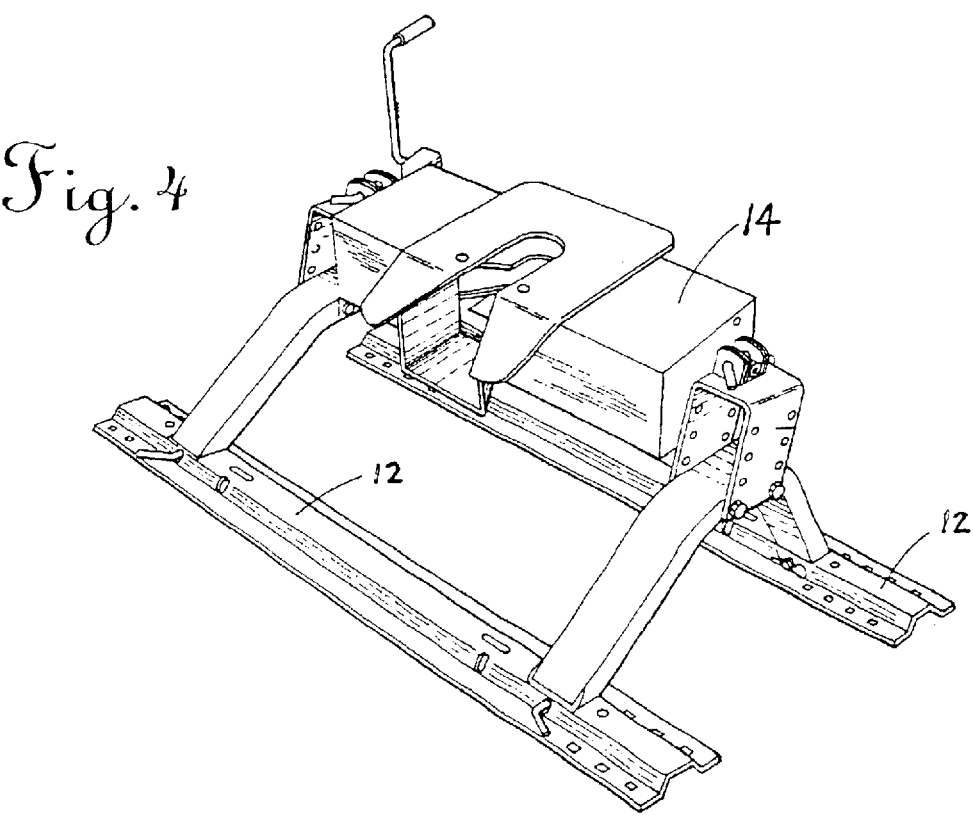

US 6,851,695 B2

BASE RAIL KIT FOR MOTOR VEHICLE

This application claims the benefit of U.S. Provisional Patent Application Ser. No. 60/379,946 filed on May 13, 2002.

TECHNICAL FIELD

The present invention relates generally to the towing field and, more particularly, to a base rail kit for a motor vehicle that may be used to mount various accessories to that vehicle including, for example, a fifth wheel trailer hitch assembly, a gooseneck hitch and/or an article stand or carrier such as a bicycle rack.

BACKGROUND OF THE INVENTION

Base rail kits have long been known and utilized to mount fifth wheel trailer hitch receiver assemblies to a motor vehicle such as the bed of a pickup truck. Examples of such kits and assemblies may be found in a number of patents including, for example, U.S. Pat. Nos. 5,509,682 to Lindenman et al. and 5,529,329 to McCoy.

The present invention relates to an improved base rail kit providing added support and rigidity. Such a base rail kit is particularly useful for mounting base rails in a corrugated, composite bed of a pickup truck.

SUMMARY OF THE INVENTION

In accordance with the purposes of the present invention as described herein, an improved base rail kit is provided for a motor vehicle. The base rail kit comprises a base rail including a first mounting flange and a second mounting flange. The kit further includes a first bracket including a first base rail support platform and a first mounting lug as well as a second bracket including a second base rail support platform and a second mounting lug. A first spacer is carried on the first bracket between the first bracket and the base rail. Similarly, a second spacer is carried on the second bracket between the second bracket and the base rail. In addition the kit includes a first fastener engaging and connecting the first and second mounting flanges with the first base rail support platform and a second fastener engaging and connecting the first and second mounting flanges with the second base rail support platform.

More specifically describing the invention, the first fastener includes a first cooperating bolt and nut and a second cooperating bolt and nut. Similarly, the second fastener includes a third cooperating bolt and nut and a fourth cooperating bolt and nut. The first spacer is engaged by the first fastener while the second spacer is engaged by the second fastener.

In accordance with yet another aspect of the present invention, the first spacer may include a first pair of individual spacer elements. Similarly, the second spacer may include a second pair of individual spacer elements. Further, the first and second brackets may also both be substantially L-shaped.

Still further describing the invention, the base rail has a width dimension W and the first and second base rail support platforms both span the width dimension W of the base rail. Additionally, the kit may include a bolt plate, a third spacer and a third fastener. The third fastener engages and connects one of the first and second mounting flanges with the bolt plate. Further, the third fastener also engages the third spacer. In a typical embodiment the first bracket is provided adjacent a first end of the base rail, the second bracket is provided adjacent a second end of the base rail and the bolt plate is provided along an intermediate portion of the base rail between the first and second ends.

Advantageously, two point mounting through the first and second mounting flanges of the base rail into both the first and second base rail support platforms provides a very stable base for supporting the base rails. Further, by abutting the upper faces of the first and second base rail support platforms and the bolt plate against the bed of the motor vehicle, the bed is effectively reinforced to provide added strength for substantially any towing application.

In the following description there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain certain principles of the invention. In the drawings:

FIG. 3 is a detailed, partially cross-sectional view illustrating the connection of the bolt plate with the base rail through the bed of the motor vehicle; and FIG. 4 is a perspective view illustrating a fifth wheel hitch assembly mounted to two base rail kits of the present invention.

Reference will now be made in detail to the present preferred embodiment of the invention, an example of which is illustrated in the accompanying drawings.

DETAILED DESCRIPTION OF THE INVENTION

Figure 1:
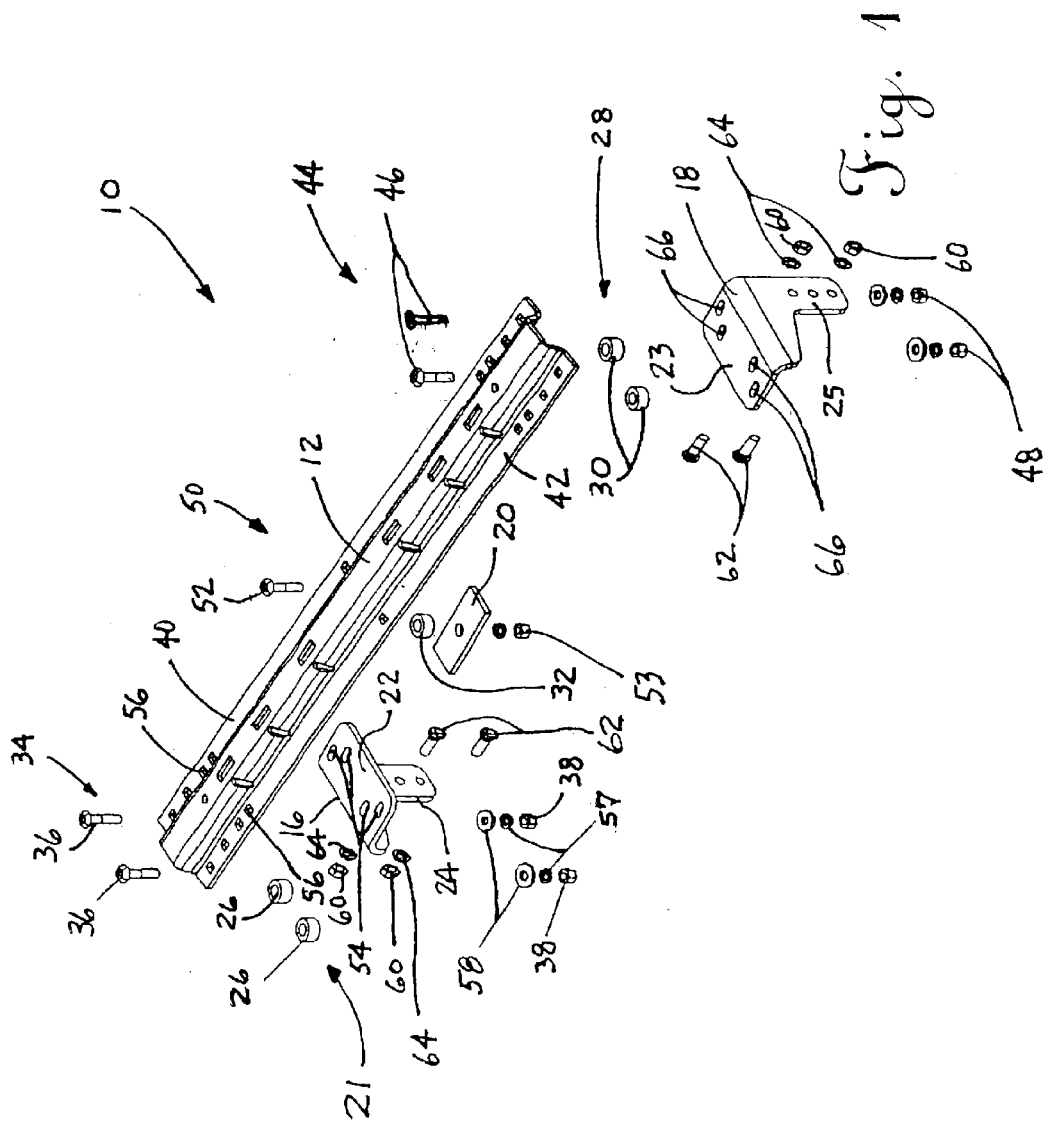
FIG. 1 is an exploded perspective view of the base rail kit of the present invention.

Reference is now made to FIG. 1 showing the base rail kit 10 of the present invention. The base rail kit 10 comprises a single base rail 12 and its associated mounting hardware. It should be appreciated that two base rail kits are utilized to mount a fifth wheel hitch assembly 14 to a motor vehicle (see FIG. 4).

The mounting hardware for each base rail 12 comprises a first bracket 16, a second bracket 18 and a bolt plate 20. The first bracket 16 includes a first base rail support platform 22 and a first mounting lug 24 that are connected together in a manner so that the first bracket 16 is substantially L-shaped. Similarly, the second bracket includes a second base rail support platform 23 and a second mounting lug 25 that are connected together in a manner so that the second bracket is substantially L-shaped.

In addition, the base rail kit 10 includes a first spacer, generally designated by reference numeral 21, comprising first and second spacer elements 26. The kit 10 also includes a second spacer 28 comprising third and fourth spacer elements 30. Further, the kit 10 includes a third spacer in the form of an individual element 32. All the spacers 21, 28, 32 and spacer elements 26, 30, 32 have a height H corresponding to the height of the corrugation of the vehicle bed B so that no stress is placed upon the bed corrugations when the base rail 12 is tightened down to the brackets 16, 18 and bolt plate 20.

A first fastener 34, including first and second cooperating bolts and nuts 36, 38 respectively, connect the first and second mounting flanges 40, 42 of the base rail 12 with the first base rail support platform 22.

Similarly, a second fastener 44, comprising cooperating third and fourth bolts and nuts 46, 48 respectively, connect the first and second mounting flanges 40, 42 with the second base rail support platform 23 of the second bracket 18.

A third fastener 50, comprising a cooperating bolt and nut 52, 53 respectively, connects one of the first and second mounting flanges 40, 42 with the bolt plate 20.

The procedure for installing a base rail kit 10 to a motor vehicle will now be described in detail. Initially, the rear of the motor vehicle is raised high enough to allow jack stands to be placed under the rear spring hanger brackets of the vehicle. This provides maximum room to install the base rail kit 10.

In order to prevent the trailer that is to be towed from hitting the cab of the motor vehicle during normal operation, the center of the fifth wheel hitch assembly 14 should be at least 52 inches from the back of the cab when using a long bed truck. Short bed trucks require a minimum of a 13 inch extended pin box for regular maneuvers and do not apply to the 52 inch criteria. Of course, the actual distance required will depend on trailer width and king pin location.

Figure 2:
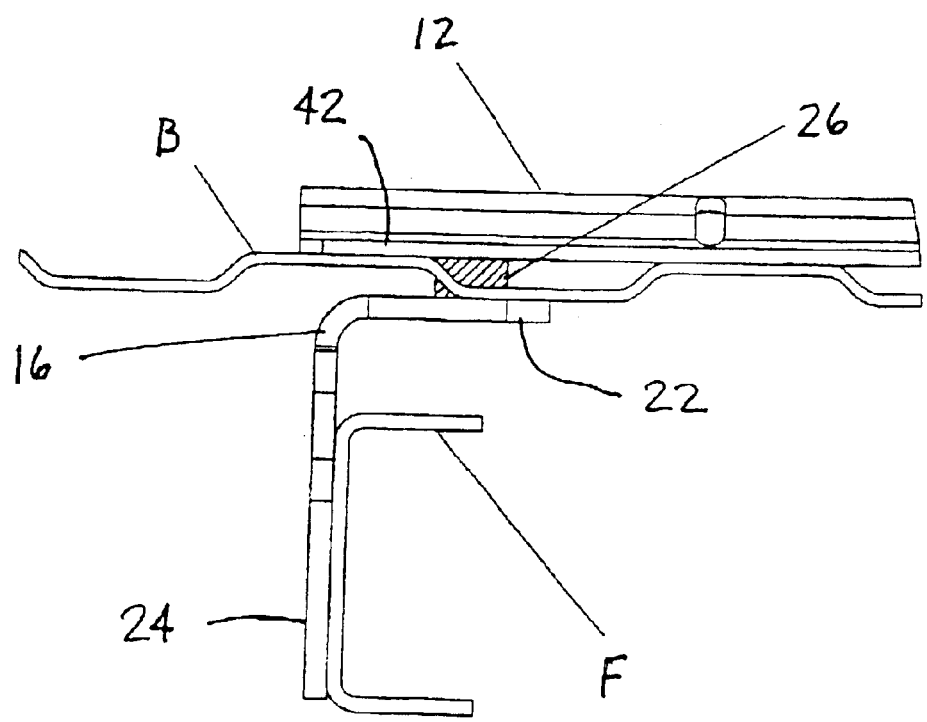
FIG. 2 is a detailed, partially cross-sectional view illustrating the connection of the first bracket with the frame of the motor vehicle and the base rail.

The hitch is centered between the fender wells and the base rails 12 of the two base rail kits 10 are mounted square in the bed at the appropriate spacing to support the fifth wheel hitch assembly 14 (see FIG. 4). Four 1½ inch holes are drilled or cut in the bed B of the motor vehicle at the desired locations (see FIG. 2). The holes may be drilled with a 3/16 inch drill and then enlarged with a 1½ inch hole saw. The first bracket 16 is then clamped to the frame F of the motor vehicle as illustrated in FIG. 2 so that the upper face of the support platform 22 abuts the lower surface of the bed B of the motor vehicle and two of the apertures 54 in the first base rail support platform are aligned with the 1½ inch holes in the bed. The first and second spacer elements 26 are then dropped into the 1½ inch holes so that they sit on the first base rail support platform 22 with the apertures in the spacer elements aligned with the apertures 54 in the support platform. The proper mounting apertures 56 in the first and second mounting flanges 40, 42 of the base rail 12 are then centered over the spacer elements 26 and a carriage bolt 36 is inserted down through the aligned apertures 56, 54 in the base rail 12, spacer elements 26 and first base rail support platform 22. A serrated washer 57, a lock washer 508 and a cooperating nut 38 are then secured to each bolt 36 to complete the connection.

As illustrated in FIG. 2 and noted above, it should be appreciated that the upper surface of the base rail support platform 22 abuts the lower surface of the bed B of the motor vehicle so as to provide additional support and rigidity to the overall structure. The first bracket 16 may be secured in this position to the frame F through the first mounting lug 24 by welding or cooperating nut and bolt fasteners 60, 62 including any appropriate lock washers 64. As should be appreciated, the first mounting lug 24 may be of substantially any desired length depending upon which length is appropriate for the particular mounting application.

The second bracket 18 is mounted in the same manner as the first bracket 16 except to the opposing frame rail F of the motor vehicle. More specifically, third and fourth carriage bolts are extended through aligned mounting apertures in the first and second mounting flanges 40, 42 of the base rail 12, the aligned third and fourth spacer elements 30 and the apertures 66 in the second base rail support platform 23. A serrated washer 57 and a lock washer 58 are provided on each bolt 46 and cooperating nuts 48 are secured to the bolts 46 to complete the connection. The second bracket 18 is then secured to the frame F through the second mounting lug 25 by welding or cooperating nut and bolt fasteners 60, 62 including any appropriate lock washers 64. Accordingly, it should be appreciated that the first bracket 16 mounts a first end of the base rail 12 to a first frame rail F of the motor vehicle while the second bracket 18 mounts a second end of the base rail 12 to a second, opposite frame rail of the motor vehicle.

Further support and rigidity is provided for the mounting by means of the bolt plate 20. More specifically, an additional hole is drilled in the bed B of the motor vehicle aligned with a mounting aperture 68 along an intermediate portion of the first or second mounting flange 40, 42 of the base rail 12. A bolt 52 of the third fastener 50 is inserted through the aperture 68 and the hole in the bed B. Next, the third spacer 32 is placed on the bolt 50 so that the bolt extends through the aperture in that spacer. An aperture 70 in the bolt plate 20 is then aligned with the bolt 52 and the bolt plate is pushed over the bolt so that the upper surface of the bolt plate engages both the third spacer 32 and the underside of the bed B. A lock washer 72 and cooperating nut 53 are then secured on the bolt 52 in order to complete the connection.

A second base rail kit 10 is mounted in the same manner at the appropriate position in the bed B. The two base rail kits 10 are then ready to receive a fifth wheel hitch receiver assembly 14 as illustrated in FIG. 4.

Numerous benefits results from employing the concepts of the present invention. As should be appreciated, the spacers 24, 28 and 32 are all of a thickness substantially corresponding to the corrugation height of the bed B of the pickup truck. Thus, the base rail 12 is fully and completely supported on the support platforms 22, 23 and the corrugated bed is rigidly backed for strength and stability. Strength and stability are still further augmented by the fact that the support platforms 22, 23 both fully span the width W of the base rail 12 thereby providing a full width base that is directly secured to the frame F of the vehicle through the mounting lugs 24, 25.

The foregoing description of a preferred embodiment of the invention has been presented for purposes of illustration and description. It is not intended to be exhaustive or to limit the invention to the precise form disclosed. Obvious modifications or variations are possible in light of the above teachings.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiment do not and are not intended to limit the ordinary meaning of the claims and their fair and broad interpretation in any way.

What is claimed is:

1. A base rail kit for a motor vehicle, comprising:
   a base rail including a first mounting flange and a second mounting flange;
   a first bracket including a first base rail support platform and a first mounting lug;
   a second bracket including a second base rail support platform and a second mounting lug;
   a first spacer carried on said first bracket between said first bracket and said base rail;
   a second spacer carried on said second bracket between said second bracket and said base rail;
   a first fastener engaging and connecting said first and second flanges with said first base rail support platform; and
   a second fastener engaging and connecting said first and second mounting flanges with said second base rail support platform; and
   a bolt plate, a third spacer and a third fastener.

2. The base rail kit of claim 1, wherein said first fastener includes a first cooperating bolt and nut and a second cooperating bolt and nut.

3. The base rail kit of claim 2, wherein said second fastener includes a third cooperating bolt and nut and a fourth cooperating bolt and nut.

4. The base rail kit of claim 3, wherein said first spacer is engaged by said first fastener.

5. The base rail kit of claim 4, wherein said second spacer is engaged by said second fastener.

6. The base rail kit of claim 5, wherein said first spacer is a first pair of individual spacer elements and said second spacer is a second pair of individual spacer elements.

7. The base rail kit of claim 1, wherein said first bracket and said second bracket are both substantially L-shaped.

8. The base rail kit of claim 7, wherein said base rail has a width dimension W and said first base rail support platform and said second base rail support platform both span said width dimension W of said base rail.

9. The base rail kit of claim 1, wherein said third fastener engages and connects one of said first and second mounting flanges with said bolt plate.

10. The base rail kit of claim 9, wherein said third fastener also engages said third spacer.

11. The base rail kit of claim 10, wherein said first bracket is adjacent a first end of said base rail, said second bracket is adjacent a second end of said base rail and said bolt plate is provided along an intermediate portion of said base rail between said first and second ends.

* * * * *

UNITED STATES PATENT AND TRADEMARK OFFICE
CERTIFICATE OF CORRECTION

| | |
|---|---|
| PATENT NO. | : 6,851,695 B2 |
| APPLICATION NO. | : 10/436509 |
| DATED | : February 8, 2005 |
| INVENTOR(S) | : Lindenman et al. |

It is certified that error appears in the above-identified patent and that said Letters Patent is hereby corrected as shown below:

Column 3, line 52, delete "508" and insert --58--

In the claims:

Column 5, claim 1, line 16, delete "and"

Signed and Sealed this

Ninth Day of January, 2007

JON W. DUDAS
*Director of the United States Patent and Trademark Office*